L. V. ROOD.
TIRE PLUG.
APPLICATION FILED JUNE 17, 1914.
1,143,141. Patented June 15, 1915.
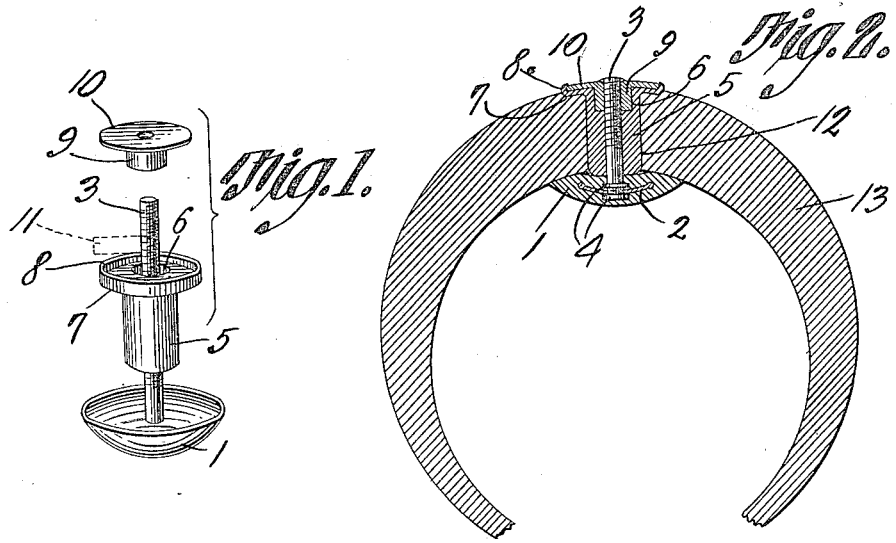
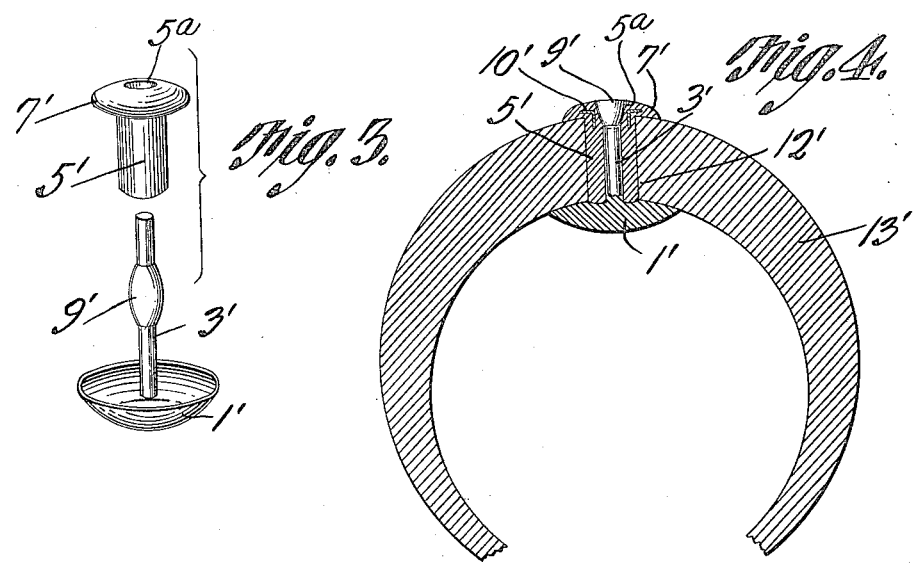
Witnesses
Lloyd V. Rood, Inventor
by Attorneys

UNITED STATES PATENT OFFICE.

LLOYD V. ROOD, OF MARIETTA, OHIO.

TIRE-PLUG.

1,143,141.  Specification of Letters Patent.  Patented June 15, 1915.

Application filed June 17, 1914. Serial No. 845,668.

*To all whom it may concern:*

Be it known that I, LLOYD V. ROOD, a citizen of the United States, residing at Marietta, in the county of Washington and State of Ohio, have invented a new and useful Tire-Plug, of which the following is a specification.

The present invention appertains to tire plugs, and aims to provide a novel and improved device for plugging or stopping up the puncture of a pneumatic tire.

The present invention contemplates the provision of a tire plug of unique construction, and embodying a novel assemblage of component parts, to enhance the utility thereof, and whereby the plug may be readily and effectively applied to a pneumatic tire, and will serve its purposes in an efficient manner without the liability of cutting or otherwise injuring the tire, or becoming broken or impaired in its use.

It is also within the scope of the invention, to provide a tire plug of comparatively simple and inexpensive construction, and which will be simple, convenient, practical, serviceable, and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawing, wherein:—

Figure 1 is a perspective view of one form of plug, with the parts separated. Fig. 2 is a sectional view of the plug as applied to the tire for closing or stopping up the puncture. Fig. 3 is a view similar to Fig. 1, of another form of the invention. Fig. 4 is a view similar to Fig. 2, illustrating the second form in use.

Referring specifically to Figs. 1 and 2, wherein one form of the invention is illustrated, the plug depicted therein, comprises a base or closer 1 of rubber or other suitable pliant and resilient material, which is of mushroom or cup-shaped formation to fit against the inside of a tire. The base or closer 1 has embedded therein, a disk or plate 2 which is concaved similar to the base or closer, and which is disposed between the faces or sides of the base.

A threaded metallic stem 3 has its butt end loosely embedded within the base or closer 1 and projects centrally from the concaved face of the base. The butt end of the stem 3 is rotatably mounted within the base 1 and through the reinforcing plate or disk 2, and is provided with collars 4 seating against the opposite faces of the plate or disk 2 to anchor the stem within the base but to enable the stem to be rotated with respect thereto.

A tubular gasket 5 of rubber or other compressible material and of smaller cross sectional area than the closer, is disposable or insertible above the stem 3 to seat against the concaved face of the base 1, and the gasket 5 is provided at its outer end or at that end remote from the base 1, with a circular socket or recess 6 surrounding the corresponding end of the bore or opening of the gasket. The gasket is also provided with an annular outturned flange 7 at its outer end and surrounding the socket or counter bore 6, and the periphery of margin of the circular flange 7 is provided with an upturned annular lip or rim 8.

A circular nut 9 is adapted to be threaded upon the stem 3, and is adapted to fit snugly within the socket or recess 6 of the gasket, and the nut 9 is provided at its outer end with an outturned annular or circular flange 10 which is seatable upon the flange 7 of the gasket within the lip or rim 8.

The stem 3 is formed of bendable or flexible material, in order that the outer or free end portion of the stem may be bent angularly, as at 11, to serve as a finger piece or lever for forcibly rotating the stem or screw.

In use, supposing the parts to be separated, as illustrated in Fig. 1, the base or closer 1, after being properly compressed or doubled, is inserted through the puncture or opening 12 formed in the tire 13, so that the base or closer is disposed upon the interior of the tire. The gasket or plug element 5, which has been slipped upon the stem 3, is then forced inwardly upon the stem into the opening 12 and against the base or closer 1, the flange 7 of the gasket seating upon the tread of the tire. The nut 9 is then threaded upon the stem 3 so that it enters the socket 6 of the gasket and whereby the flange 10 of the nut seats upon the flange 7 of the gasket snugly within the lip or rim 8. The plug is then made secure, by rotating the stem 3, which may be readily accomplished by bending the free portion of the stem angularly, as at 11, and which will cause the nut 9 to be forced inwardly so as to cause the base 1 to seat tightly against the inner surface of the tire, surrounding the opening 12, and to spread out slightly, as seen in Fig. 2, to provide an air-tight joint between the rim of the base or closer 1 and the tire. The nut 9 being tightened, will also cause the flange 7 of the gasket and the flange 10 of the nut to seat tightly upon the tread of the tire, and furthermore, the nut 9 and base 1 being drawn toward each other, will cause the gasket 5 to be compressed or bulged within the opening 12, so that the gasket entirely fills up the said opening and seats tightly against the walls thereof. After the plug has been made secure, the stem 3 is cut off, adjacent the outer face of the nut 9.

During the application of the parts of the plug to the tire, cement may be injected into the puncture or opening 12, whereby the base or closer 1 and gasket will be cemented to the tire, and when the cement has set, will firmly secure the base and gasket to the tire to prevent leakage. It is to be noted in this respect, that the base or closer 1 being of mushroom or cup-shape, will serve to hold the cement, and when the plug is tightened up, the cement will be forced between the adjacent portions of the base, gasket and tire to thoroughly cement the said parts together.

From the foregoing, taken in connection with the drawings, the advantages and capabilities of the present invention will be obvious to those versed in the art, particular attention being called to the fact, however, that the present plug is more or less pliable or yieldable, as a whole, to conform to the distortions of the tire in use. The present device is not liable to break in its use, and will not tend to cut or injure the tire, it being noted that the metallic stem and nut do not contact with the tire, and are spaced from the tire at all points by rubber or compressible portions.

The form of the invention illustrated in Figs. 3 and 4 is modified in certain details, but in general has the advantages and functions above noted. The modified form includes a base or closer 1' resembling that above described, and which has an integral rubber or pliable stem 3' projecting concentrically from its concaved face. The compressible gasket 5' adapted to be slipped over the stem 3' is provided at its outer end with an annular dished or mushroom-shaped flange or lip 7' seatable snugly upon the tread of the tire. The stem 3' is provided at the proper point thereon, with a yieldable or compressible knob or enlarged portion 9' which is adapted to be drawn through the gasket 5' and is adapted to fit snugly with the outer flared end 5ª of the bore of the gasket to hold the gasket in compressed condition against the base or closer 1'. The gasket 5' has embedded within its outer end portion, a reinforcing ring 10' which is preferably of metal, and which is of angular cross section to provide flanges projecting into the body portion of the gasket 5' and into the flange or lip 7'. The reinforcing ring 10' surrounds the outer end portion of the bore of the gasket, to prevent the outer end portion of the gasket from spreading readily, and to hold the flange or lip 7' in position. The outer side or face of the flange 7' is preferably rounded or convexed, to present an even surface.

In applying the modified form of plug to the tire, the base or closer 1' is inserted through the puncture or opening 12' formed in the tire 13', and the gasket 5' is slipped over the stem 3' and forced past the knob 9' into the opening 12' and against the base or closer 1'. The knob 9' is so positioned, that it bears against or fits partially within the outer end of the gasket 5' and holds the gasket in compressed condition within the opening 12' for the purpose above pointed out. The dished or mushroom shaped flange 7' of the gasket seats tightly upon the tread of the tire, and the knob 9' lies snugly upon the gasket, to hold the plug in place. It is to be noted that the reinforcing ring 10' prevents the knob 9' from being accidentally drawn through the gasket 5'. In this form of the invention, the only metallic part is the reinforcing ring 10', which is entirely embedded within the gasket, and which is not liable to prove injurious to the plug or tire. This form of the device is preferably employed when the plug is to be cemented in place, as above indicated, and although this form is not so desirable for use by the ordinary rider or driver while on the road, it is readily applied to the tire in the garage or workshop.

From Fig. 4 is it will be apparent, that when the modified form of plug is assembled with the tire, the free end portion of the stem 3' may be cut off by severing the knob 9' flush with the gasket 7' to eliminate any encumbering projection.

Having thus described the invention, what is claimed as new is:—

1. A tire plug including a closer adapted to fit against the inside of a tire and having a stem to pass through an opening in the tire, and a compressible gasket of smaller cross sectional area than the closer adapted to be slipped onto the said stem and held against the closer to fit within the said opening.

2. A tire plug including a closer adapted to fit against the inside of a tire and having a stem to pass through an opening in the tire, a compressible gasket of smaller cross sectional area than the closer adapted to be slipped onto the said stem to fit within the said opening, and means carried by the stem for holding the gasket against the closer.

3. A tire plug including a closer adapted to fit against the inside of a tire and having a stem to pass through an opening in the tire, a tubular compressible gasket adapted to be slipped onto the stem, the gasket being of a cross sectional area smaller than that of the closer, and means carried by the stem for bearing against the outer end of the gasket to hold the gasket in compressed condition against the closer.

4. A tire plug including a closer adapted to fit against the inside of a tire and having a stem to pass through an opening in the tire, and a compressible gasket adapted to be slipped onto the said stem into the said opening to be held against the closer and having a flange to overlap and seat against the outside of the tire.

5. A tire plug including a closer adapted to fit against the inside of a tire and having a stem to pass through an opening in the tire, a compressible gasket adapted to be slipped onto the said stem into the said opening and having a flange to overlap and seat against the outside of the tire, and means carried by the said stem and coöperable with the gasket for holding the gasket in place upon the stem.

6. A tire plug including a closer adapted to fit against the inside of a tire and having a stem to pass through an opening in the tire, a compressible tubular gasket adapted to be slipped onto the stem into the said opening and having a flange at its outer end to seat against the outside of the tire, and means carried by the stem for bearing against the outer end of the gasket to hold the gasket in compressed condition against the closer.

In testimony that I claim the foregoing as my own, I have hereto affixed my signature in the presence of two witnesses.

LLOYD V. ROOD.

Witnesses:
J. HARRY McCLURE,
HARRY R. BUCHANAN.

Copies of this patent may be obtained for five cents each, by addressing the "Commissioner of Patents, Washington, D. C."